(12) United States Patent
Chen et al.

(10) Patent No.: US 6,985,635 B2
(45) Date of Patent: Jan. 10, 2006

(54) SYSTEM AND METHOD FOR PROVIDING A SINGLE-LAYER VIDEO ENCODED BITSTREAMS SUITABLE FOR REDUCED-COMPLEXITY DECODING

(75) Inventors: Yingwei Chen, Briarcliff Manor, NY (US); Zhun Zhong, Croton, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 639 days.

(21) Appl. No.: 10/127,528

(22) Filed: Apr. 22, 2002

(65) Prior Publication Data

US 2003/0198293 A1   Oct. 23, 2003

(51) Int. Cl.
G06K 9/36    (2006.01)
G06K 9/46    (2006.01)

(52) U.S. Cl. .................... 382/250; 382/166; 382/251; 348/413.1; 358/426.14; 375/240.2

(58) Field of Classification Search ................ 382/166, 382/239, 250; 348/395.1, 401.1, 402.1, 403.1, 348/407.1, 413.1, 416.1; 358/426.14; 375/240.01, 375/240.12–240.18, 240.2; 352/426.14
See application file for complete search history.

(56) References Cited

U.S. PATENT DOCUMENTS 5,598,484 A * 1/1997 Suzuki et al. ............... 382/239
6,049,629 A * 4/2000 Hirabayashi ................ 382/239

OTHER PUBLICATIONS

Bhaskaran et al. (Image and Video Compression Standards: Algorithms and Architectures, 2nd ed., 1997, pp. 158-161 & 186-190).*

* cited by examiner

Primary Examiner—Kanjibhai Patel
Assistant Examiner—Yubin Hung

(57) ABSTRACT

A method and system of reducing the computation load of an MPEG decoder by changing the encoding algorithms in a video-processing system are provided. During an encoding mode, a stream of data blocks is received and at least one motion vector and one motion compensation prediction value for each macro-block are generated. The prediction value is transformed into a set of DCT coefficients. Prior to the quantizing step, the set of DCT coefficients are modified according to predetermined criteria. To this end, the total energy level of the DCT coefficients excluding the lowest 2×2 DCT coefficients is computed, and last column and last row of the DCT coefficients is discarded alternatively until the total energy level of the DCT coefficients reaches a predetermined energy level. Therafter, the discarded column or row is assigned to a predetermined value. The modified DCT coefficients are then quantized and encoded, thereby generating a bit stream of encoded macro-blocks, which are subsequently decoded according to a conventional decoding process.

24 Claims, 4 Drawing Sheets

| 16 | 16 | 16 | 16 | 32 | 64 | 128 | 255 |
|---|---|---|---|---|---|---|---|
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |

FIG. 3a

| 16 | 16 | 16 | 16 | 32 | 64 | 128 | 255 |
|---|---|---|---|---|---|---|---|
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 16 | 16 | 16 | 16 | 32 | 64 | 128 | 255 |
| 255 | 255 | 255 | 255 | 255 | 255 | 255 | 255 |

FIG. 3b

| 16 | 16 | 16 | 16 | 32 | 64 | 255 | 255 |
|---|---|---|---|---|---|---|---|
| 16 | 16 | 16 | 16 | 32 | 64 | 255 | 255 |
| 16 | 16 | 16 | 16 | 32 | 64 | 255 | 255 |
| 16 | 16 | 16 | 16 | 32 | 64 | 255 | 255 |
| 16 | 16 | 16 | 16 | 32 | 64 | 255 | 255 |
| 16 | 16 | 16 | 16 | 32 | 64 | 255 | 255 |
| 16 | 16 | 16 | 16 | 32 | 64 | 255 | 255 |
| 255 | 255 | 255 | 255 | 255 | 255 | 255 | 255 |

FIG. 3c

SYSTEM AND METHOD FOR PROVIDING A SINGLE-LAYER VIDEO ENCODED BITSTREAMS SUITABLE FOR REDUCED-COMPLEXITY DECODING

BACKGROUND OF THE INVENTION

1. Field of the Invention

The present invention relates to the compression of digital video information and, more particularly, to a method and device for providing different coding strategies to obtain efficiency during decoding.

2. Description of the Related Art

Single-layer video coding is most widely used in a variety of applications, such as digital-video recording and digital television. The video is encoded at a certain bit rate, then a decoder decodes the bit-stream and outputs every picture at the encoded full quality. To reduce the computation load the reduced-complexity decoding of single-layer bit-streams has been deployed. However, as pictures are decoded at partial quality, the reference pictures used for motion compensation on the decoder side frequently do not match the ones used during encoding. As a result, errors that occur in the reference pictures propagate to other pictures. This is also known as prediction drift or error propagation.

Layered-video coding or bit-rate scalable method is an alternative to the single-layer video coding. The video is encoded first at a low bit rate to generate the base layer. The difference between the original and the base-layer-reconstructed video is then encoded to generate one or more enhancement layers. On the decoder side, the base layer is always decoded, but the enhancement layer is fully or partially decoded depending on the available processing capacity. If only the base layer is decoded, there is no prediction drift as low-quality reference pictures are used for encoding. If both the full enhancement layer and the base layer are decoded, each layer uses its corresponding reference pictures during encoding for decoding purposes, thus there is no prediction drift. However, if the enhancement layer is only partially decoded and there is a motion prediction among enhancement-layer pictures, the prediction drift occurs in the enhancement layer. Moreover, this type of coding is inherently less efficient during compression as the reference pictures used in the enhancement layer do not lend themselves to efficient motion prediction. Furthermore, the extra overhead in multi-layered coding is more complex than decoding a single-layer bit stream to produce the same quality. Accordingly, there is a need for obtaining optimal decoding performance that is relatively simple to facilitate practical implementation.

SUMMARY OF THE INVENTION

The present invention relates to a method and system for improving the decoding efficiency of an MPEG digital-video-decoder system by changing the single-layer encoding algorithms to obtain an encoded digital-video signal suitable for variable complexity decoding.

According to one aspect of the invention, a method of encoding a stream of input-video image having at least one macro-block is provided. The method includes the steps of: generating a motion vector for each macro-block of the input-video image; generating a predictive-image signal of the input-video image based on the motion vector; transforming the predictive-image signal into a two-dimensional array of DCT coefficients; modifying the array of the DCT coefficients into a set of new DCT coefficients according to predetermined criteria; quantizing the new DCT coefficients into a quantized DCT value; performing a zigzag scan to read each row of the new DCT coefficients into a serial chain; and, coding the serial chain from the zigzag scan and the motion vector to produce an encoded macro-block. The step of modifying the array of the DCT coefficients comprises the steps of: discarding the last-column DCT coefficients and the last-row DCT coefficients alternatively until the energy level of the DCT coefficients reaches a predetermined energy level; and, assigning the discarded column or row with a predetermined value. The step of modifying the array of the DCT coefficients comprises the steps of: calculating a total energy level of the DCT coefficients excluding the lowest 2×2 DCT coefficients; discarding the last column and the last row of the DCT coefficients alternatively until the total energy level of the DCT coefficients reaches a predetermined energy level; and, assigning the discarded column and row to a predetermined value. The method further includes the steps of: dequantizing the quantized DCT value to generate dequantized, decoded data; transforming the dequantized, decoded data from a frequency domain to a spatial domain to produce reference data; and, performing a motion compensation on the reference data to produce motion-compensation pictures. In the embodiment, a full-pel motion compensation on a predictive (P) picture of the input-video image is performed prior to the step of transforming the predictive-image signal into the array of the DCT coefficients.

According to another aspect of the invention, a method of encoding input-video image having at least one macro-block includes the steps of: (a) generating at least one motion vector and at least one motion-compensation-prediction value for each macro-block of the input-video image; (b) transforming the prediction value into a set of DCT coefficients; (c) modifying the set of the DCT coefficients into a set of new DCT coefficients according to predetermined criteria; (d) quantizing the set of the DCT coefficients; and, (e) coding the quantized set of the coefficients and the motion vector to produce an encoded macro-block. The method further includes the steps of forwarding the encoded macro-block to a decoding process; determining the type of picture from the input-video image, wherein, if a predictive picture is detected from the input-video image, performing a full-pel motion compensation on the input-video image prior to performing the step (b) of transforming the prediction value into the set of the DCT coefficients. When a predictive picture is detected from the input-video image, the motion vector is converted to a full-motion vector. The array of the DCT coefficients is modified by calculating a total energy level of the DCT coefficients excluding the lowest 2×2 DCT coefficients; discarding the last column and the last row of the DCT coefficients alternatively until the total energy level of the DCT coefficients reaches a predetermined energy level; and, assigning the discarded column and row with a predetermined value. The method further includes the steps of: dequantizing the quantized DCT value to generate dequantized, decoded data; transforming the dequantized, decoded data from a frequency domain to a spatial domain to produce reference data; and, performing motion compensation on the reference data to produce motion-compensation pictures.

According to a further aspect of the invention, an encoding system for encoding an input-video image includes a motion-estimation-prediction module configured to receive the input-video image and to generate at least one motion vector and at least one prediction-error signal; a discrete-cosine-transformer (DCT) module coupled to the output of the motion-estimation-module for transforming the prediction-error signal into a two-dimensional array of DCT coefficients, the DCT coefficients being modified according to the classification of a picture type from the input-video image; a quantization module, coupled to the DCT module, for quantizing the modified DCT coefficients to produce quantized coefficients; a zig-zag scanning module, coupled to the quantization module, configured to convert the quantized coefficients into a serial representation; and, a coding module for coding the quantized set of the coefficients and the motion vector to produce an encoded macro-block. The system further includes: an inverse-quantization module coupled to receive and inverse the quantized coefficients received from the quantization module; an inverse-discrete-cosine transformer (IDCT) coupled to the output of the inverse-quantization module for transforming the dequantized coefficients from a frequency domain to a spatial domain; and, a reference-frame-buffer for receiving output signals from the IDCT to form motion-compensated pictures.

Yet another aspect is that the present invention may be implemented in hardware, software, or a combination of hardware and software as desired for a particular application.

Furthermore, the present invention may be realized in a simple, reliable, and inexpensive implementation.

These and other advantages will become apparent to those skilled in this art upon reading the following detailed description in conjunction with the accompanying drawings.

BRIEF DESCRIPTION OF THE DRAWINGS

A more complete understanding of the method and apparatus of the present invention may be had by reference to the following detailed description when taken in conjunction with the accompanying drawings wherein:

FIG. 2 shows a graphical representation of modifying DCT coefficients for reducing the computation load during decoding in accordance with the present invention;

FIG. 3 shows a graphical representation of modifying DCT coefficients prior to performing quantization in accordance with the present invention; and, FIG. 4 is a flow chart illustrating the process of reducing the computation load during decoding in accordance with the present invention.

DETAILED DESCRIPTION OF THE EMBODIMENTS

Figure 1:
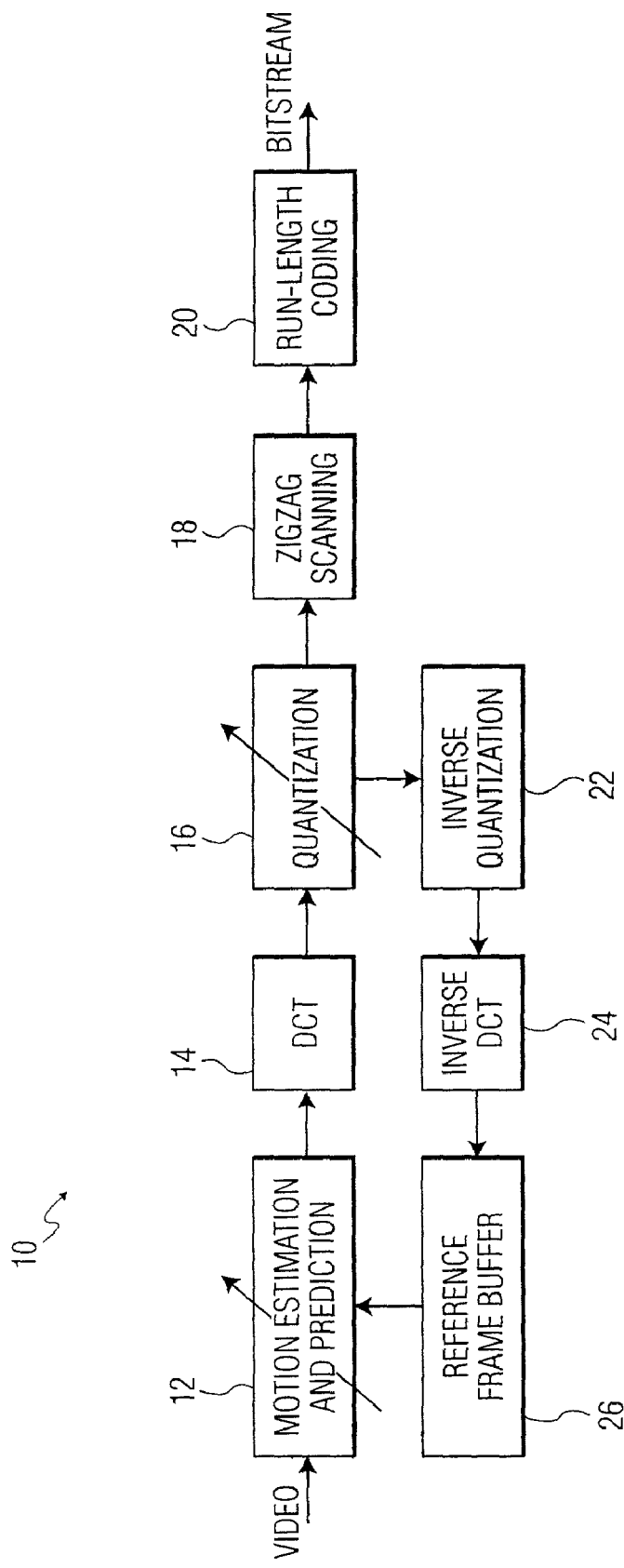
FIG. 1 shows an exemplary embodiment of the encoder for compressing video information.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices, circuits, and methods are omitted so as not to obscure the description of the present invention with unnecessary detail.

In order to facilitate an understanding of this invention, a conventional method of compressing and decoding video data in accordance with the MPEG standard will be described briefly hereinafter.

To reduce the high cost of video-compression codecs and implement ways to provide inter-operability of equipment between different manufacturers, a compression standard was created by the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition Aug. 1, 1993 which is hereby incorporated by reference in its entirety.

Under the MPEG standard, there are three types of frames of video information: intra-frames (I frame), forward-predicted frames (P frame), and bi-directional-predicted frames (B frame). The I frame is periodically coded, i.e., one independently coded frame for each group of frames. A prediction is made of the composition of a video frame, the P frame, to be located a specific number of frames forward and before the next reference frame. The B frame is predicted between two reference frames, or by interpolating (averaging) a macro-block in the past reference frame with a macro-block in the future reference frame. The motion vector is also encoded which specifies the relative position of a macro-block within a reference frame with respect to the macro-block within the current frame. The current frame may be encoded based on a previous frame and a subsequent frame. As such, one frame needs to be encoded based on the MPEG encoding convention, and then other frames relating to that frame are encoded based on the differences from that frame, except the I frame, which is always coded independent of other frames.

In motion-compensation-based video coding, motion vectors can have integer values (i.e., full-pel coding) in which the values of pixels in the current frame are specified in terms of the value of actual pixels in the reference frame, or half-integer values (i.e., half-pel coding), quarter-integer values (i.e., quarter-pel coding), and fractional values (i.e., fractional-pel coding) in which the values of pixels in the current frame are specified in terms of "virtual" pixels that are interpolated from existing pixels in the reference frame. The half-pel motion compensation as well as the quarter-pel and the frational-pel motion compensation are more computationally extensive than the full-pel motion compensation as the decoder has to interpolate a macro-block from the previous macro-block referenced by the motion vector using the half, quarter, fractional-pel grids, respectively.

Frames are coded using a discrete-cosine-transform (DCT) coding scheme, which encodes coefficients as an amplitude of a specific cosine-basis function. The DCT coefficients are quantized and further coded using variable or run-length encoding. Upon receiving the compressed coded frames, a decoder decodes the macro-block of a present P frame by performing motion compensation with a motion vector applied to a corresponding macro-block of a past reference frame. The decoder also decodes a macro-block of a B frame by performing motion compensation with motion vectors applied to respective past and future reference frames. A macro-block of pixels in one frame can be obtained by translating a macro-block of pixels in a previous or subsequent frame. The amount of translation is referred to as the motion vector. As the I frame is encoded as a single image with no reference to any past or future frame, no motion processing is necessary when decoding the I frame.

Motion compensation, as described above, is one of the most computationally intensive operations in many common video-decompression methods, especially when fractional motion vectors are used. As such, video systems unable to keep up with the computational demands of the above decompression burden frequently drop entire frames. This is sometimes observable as a momentary freeze of the picture in the video playback, followed by sudden discontinuities or jerkiness in the picture. To reduce the processing requirements associated with decompression methods on the decoding end, various decoding complexity reduction methods have been developed. The present invention provides a novel way to construct the compressed video bitstream such that decoding complexity can be reduced while maintaining the quality of the resulting video image.

FIG. 1 illustrates a simplified block diagram of the encoder 10 according to the embodiment of the present invention for encoding video signals. The encoder 10 includes a motion estimation and prediction-module 12, a DCT module 14, a quantization-module 16, a zigzag-scanning module 18, a run-length-coding module 20, an inverse-quantization module 22, an inverse-DCT-module 24, and a reference-frame-buffer module 26. In the preferred embodiment of the present invention, the encoder 10 may be implemented in the central processing unit of a personal computer, workstation, personal-digital-assistant (PDA), hand-held computer, and/or an integrated circuit such as a microprocessor, digital-signal processor, micro-controller, micro-computer and/or any other device that manipulates digital information based on programming instructions. The reference-frame-buffer 26 may be a hard-drive memory, random-access memory, read-only memory, external memory and/or any other device that stores digital information. Note that the set of modules comprising the motion-compensation-and-prediction-module 12, the inverse-quantization-module 22, and the inverse-DCT-module 24 is generally known as an "embedded decoder." This type of decoding modules is well known to those of ordinary skill in the art; thus, descriptions thereof are omitted to avoid redundancy.

The input-video signals received by the encoder 10 may be signals from a camcorder, a DVD player, a VCR, a television tuner and/or any other device that receives digital information. This stream of video information is converted from analog signals to digital signals, then applied to the encoder 10. The input-video signals are further divided into a plurality of layers such that each picture corresponding to a sheet of image (frame) is divided into a plurality of slices, and each slice consists of a plurality of macro-blocks disposed in a line from left to right and from top to bottom. Each of the macro-blocks consists of six components: four brightness components Y1 through Y4, which are representative of the brightness of four 8×8 pixel blocks constituting the macro-block of 16×16-pixels, and two colors (U, V) constituting difference components Cb and Cr of 8×8 pixel blocks for the same macro-block. The division of the picture into block units improves the ability to smooth out the changes between two successive pictures.

As shown in FIG. 1, the motion-estimation-and-prediction-module 12 is adapted to receive the input-video signals for estimating motion vectors to provide an offset from the coordinates of a current picture block to the coordinates of a reference frame. The motion vectors can be used later to reconstruct a current frame from a previous reference frame as the motion information reduces the high redundancy that exists between the consecutive frames of a video sequence. In addition, an estimate of the current frame can be obtained using the previously-decoded frame and the motion vectors. Motion compensation involves a prediction that uses motion vectors to provide offsets into the past and/or future reference frames containing previously-decoded sample values that are used to form the prediction error.

Each of the 8×8 pixel blocks of the macro-blocks is then subjected to a discrete-cosine-transform (DCT) to generate a set of an 8×8 block of DCT coefficients for each of the 64 frequency bands therein. Note that each coefficient can be treated independently without the loss of compression efficiency. The resulting 8×8 block of DCT coefficients is received by the quantization-module 16. In the preferred embodiment of the present invention, the amount of information to encode for each macroblock is also adjusted by processing some high-frequency DCT coefficients according to predetermined criteria (explained later with reference to FIGS. 2 and 3) prior to the quantization. The DCT coefficients in an 8×8 pixel block are then divided by a corresponding coding parameter, i.e., a quantization weight. The quantization weights for a given 8×8 pixel block are expressed in terms of an 8×8 quantization matrix. Thereafter, additional calculations are effected on the DCT coefficients to take into account the quantizer scale value for each macroblock. Note that quantization scale value corresponds to the degree of spatial adjustment of quantization precision that can vary from macroblock. The adjustment often exploits human eye, varying sensitivity to loading artifacts depending on the characteristics of each macroblock visual content. By quantizing the DCT coefficients with such quantization value, many of the DCT coefficients are converted to zeros, thus improving image-compression efficiency.

The resulting 8×8 block of quantized DCT coefficients is received by the zigzag-scanning-module 18, where the two-dimensional block of quantized coefficients is scanned in a "zig-zag" order to convert it into a one-dimensional string of quantized DCT coefficients. Thereafter, the run-length coding-module 20 encodes the string of quantized DCT coefficients, macro-block type, and motion vectors using run-length coding to improve coding efficiency by encoding a run of symbols with a single symbol. Note that this coding scheme is well known in the art, and that other well-known coding scheme, such as Huffman coding, may be deployed in accordance with the techniques of the present invention.

Now, the provision of encoding suitable variable complexity decoding by adjusting the information in the high-frequency DCT coefficients prior to the quantization according to the present invention will be explained in a detailed description.

Figures 2A, 2B, 2C:
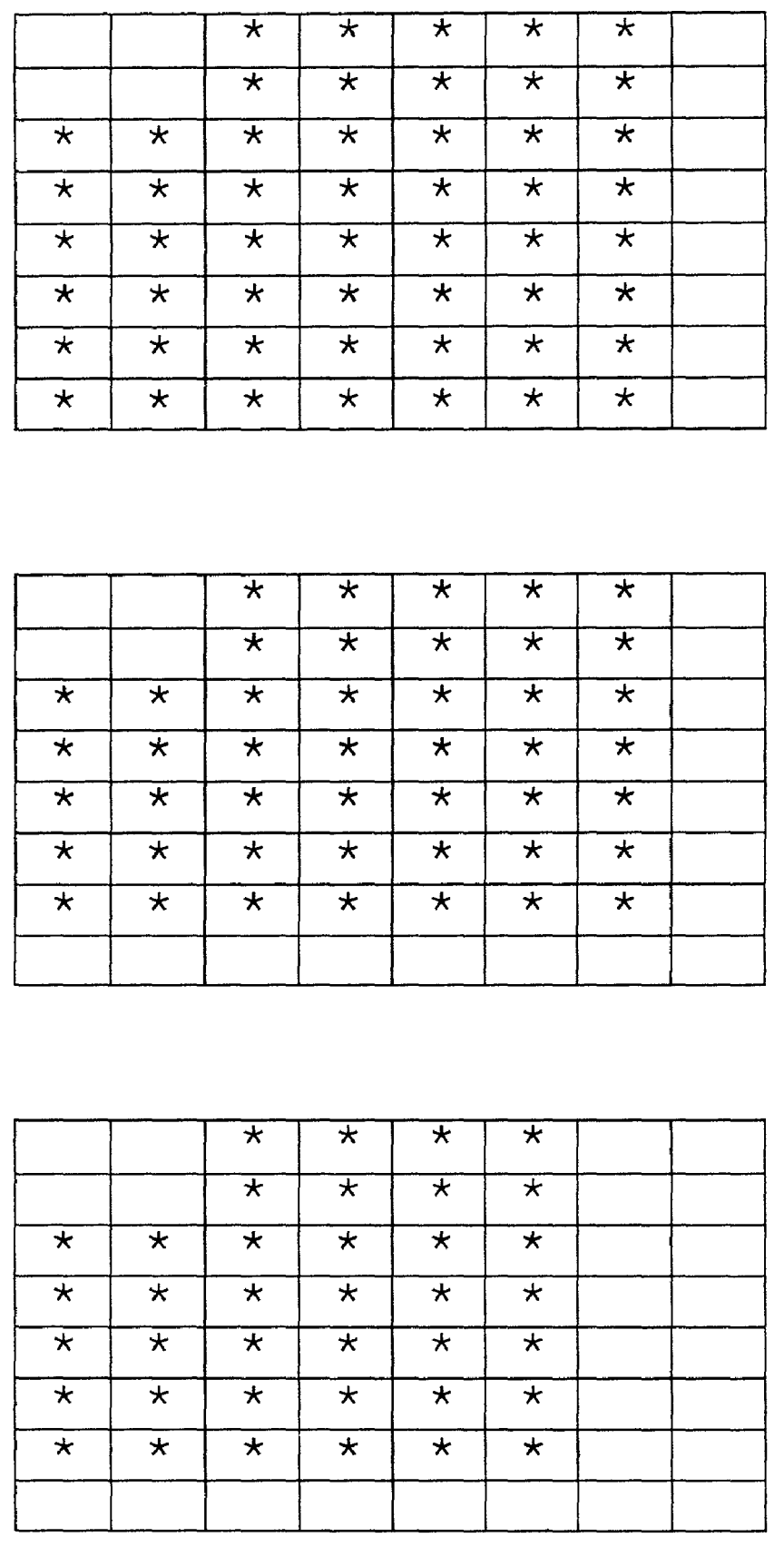

Referring to FIG. 2, a picture is divided into a 8×8 pixel matrix blocks and DCT is performed by the DCT-module 14 in units of blocks to obtain 8×8 transform coefficients. The resulting rectangle 8×8 block of DCT coefficients then undergoes a mask transformation (hereinafter referred as "DCT mask") in which the DCT coefficients are analyzed to obtain a rectangle that contains a specific percentage ($\alpha_I$) of energy of DCT coefficients. This rectangle is obtained by first calculating the total energy of all DCT blocks, except the lowest 2×2 DCT coefficients. Then, the last or eighth-column frequency component is discarded during energy-level calculation, and the energy level excluding the lowest 2×2 DCT coefficients is calculated again, as shown in FIG. 2(a). At this time, it is determined whether the newly-calculated energy level exceeds a predetermined percentage, for example, 85% from the total energy. If not, the last or eighth-row frequency component is discarded when calculating the remaining energy level of DCT blocks, excluding the lowest 2×2 DCT coefficients, as shown in FIG. 2(b). If the newly-calculated energy level does not fall under the predetermined percentage, the seventh-column frequency component is discarded, as shown in FIG. 2(c), then a new energy level of the remaining DCT blocks, excluding the lowest 2×2 DCT coefficients, is calculated again. In this manner, an additional, column-and-row-frequency component is discarded alternatively until a desired energy level is obtained.

Referring to FIG. 3, once the desired energy level is acquired, the column-and-row-frequency components that were discarded when calculating the desired energy level are assigned to a relatively high quantization matrix weight, for example, 255. By quantizing the DCT coefficients with such high value, the DCT coefficients are effectively converted to zeros during quantization. Discarding the high frequency DCT coefficients will not cause significant prediction drift as a similar operation is performed during encoding.

Note that pictures decoded with reduced complexity do not have as much high-frequency information as pictures on the encoder side, but the reduced complexity tends to contribute to a prediction drift. If reference pictures used on the encoder side can be made closer to pictures resulting from partial-quality decoding, the prediction drift can be reduced. Thus, in the preferred embodiment of the present invention, it is necessary to give different weights to the type of picture being encoded as some pictures tend to contribute less to the prediction drift. Those skilled in the art will appreciate that the P pictures in the current Group of Pictures (GOP) contribute less to the prediction drift than I pictures as there are fewer frames for error propagation before the next intra-picture. As such, the quantization matrix or DCT mask for later pictures in a GOP must be designed with less consideration when performing reduced-complexity decoding according to the present invention. Similarly, the quantization matrix or DCT mask for I pictures, the first picture in a GOP, should be designed with the most consideration for the prediction drift in the event of partial-quality decoding. Further, as B pictures are not used as reference pictures, no DCT mask is needed. Accordingly, during encoding the quantization matrix for B pictures may stay the same as that for optimized single-layer encoding.

Note further that another way to reduce decoding complexity is by simplifying motion compensation as the motion compensation tends to be a computationally intensive operation. Thus, in the preferred embodiment of the present invention, a coarser-precision MC during encoding can be applied to further facilitate variable complexity decoding. For example, if ½ pel MC is used for encoding (as in MPEG-2), the decoder may be forcedtp apply only full-pel motion compensation without interpolating ½-pel-position pixel values when non-integer motion vectors are used for the current macro-block during computation peak load periods. Similarly, if ¼ pel MC is used for encoding ½ pel MC, full-pel MC, or any combination thereof, can be applied for decoding. Accordingly, prediction drift from reduced-complexity decoding can be eliminated or reduced if simplified motion prediction is utilized during encoding for only the P pictures. However, the motion prediction is not performed for I pictures thus is not applicable. Also, as B pictures are not used as future reference pictures, the B pictures can be encoded with full-complexity higher precision motion compensation.

Figure 4:
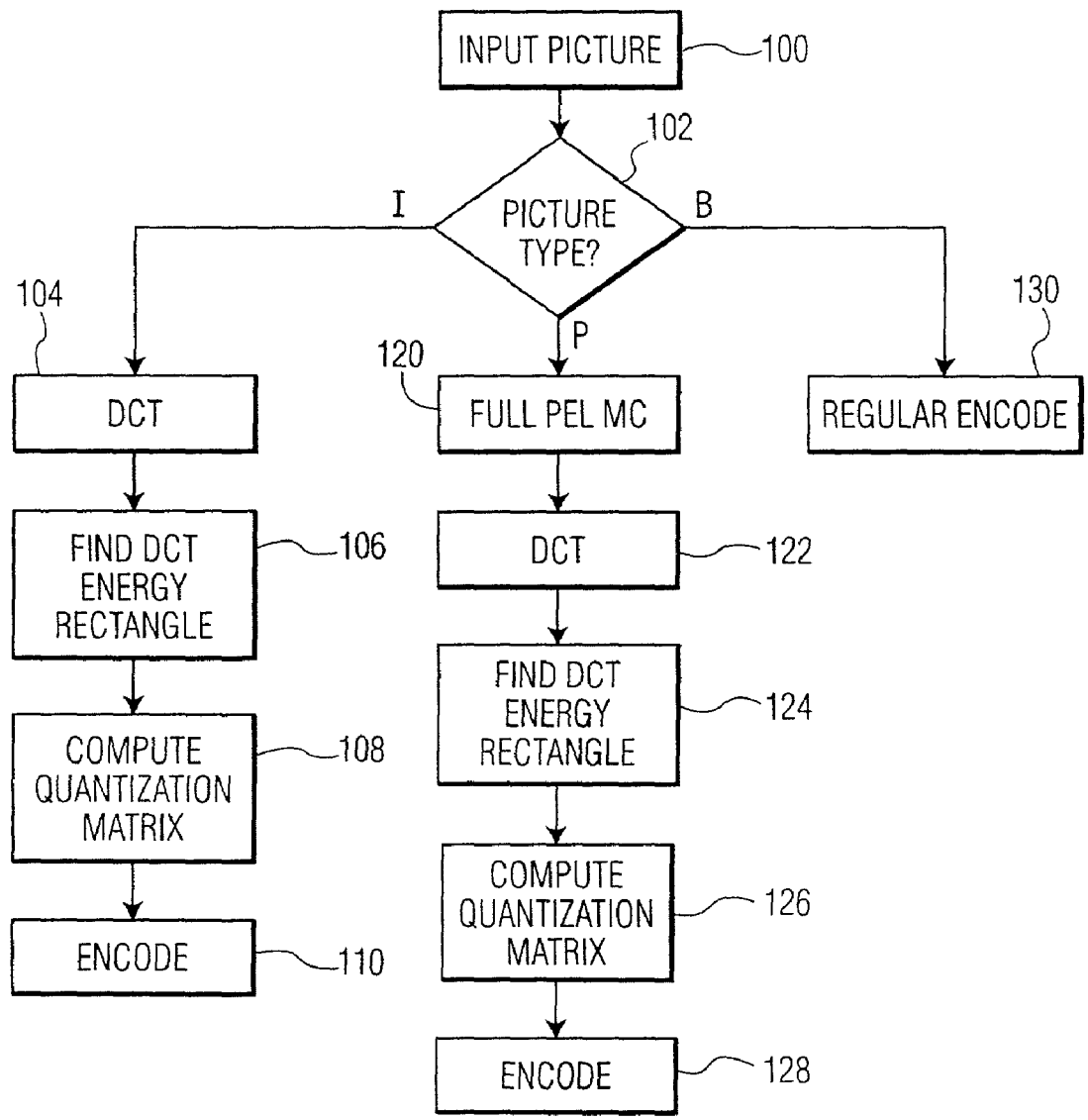

In view of the above considerations, the following flow chart of FIG. 4 shows the encoding-operation process that is capable of reducing decoding complexity according to the embodiment of the present invention.

Referring to FIG. 4, upon receiving the input-video information by the encoder 10 in step 100, it is detected for the type of picture in step 102, so that a different encoding mode can be applied according to the picture classification as described hereinafter.

I. The Current Picture is Encoded as an Intra (I) Picture.

The I frame picture is partitioned into 8×8 blocks, then DCT is performed in step 104 where each coefficient is denoted $C_{i,j}$, where i and j range from 0 to 7. In step 106, the DCT coefficients are analyzed to obtain a rectangle that contains $\alpha_I$ of energy of DCT coefficients, excluding the lowest 2×2 DCT coefficients.

In mathematical term, the rectangle $(i_{\alpha_I}, j_{\alpha_I})$ is obtained as follows:

First, calculate the total energy of all DCT blocks except the lowest 2×2 coefficients:

$$E = \sum_{blocks} \left( \sum_{i=0}^{7} \sum_{j=0}^{7} C_{i,j}^2 - \sum_{i=0}^{1} \sum_{j=0}^{1} C_{i,j}^2 \right).$$

Next, calculate $E_\alpha = \alpha_I E$. Next, set initial row-and-column numbers: i=j=7. Next, iterate through the following steps:

compute $$E = E - \sum_{blocks} \sum_{k=0}^{i} C_{k,j}^2$$

(This step discards the far right column frequency component), if $E <= E_\alpha$, stop and output (i,j−1); otherwise continue with the next step;

compute $$E = E - \sum_{blocks} \sum_{l=0}^{j-1} C_{i,l}^2$$

(This step discards the far lowest row frequency component), if $E <= E_\alpha$, stop and output (i−1,j−1); otherwise continue with the next step $i = i-1; j = j-1.$ After obtaining the rectangle-yielding desired energy level, quantization matrix for the corresponding rectangle is calculated in step 108. Assume the quantization matrix for full encoding is $\{W_{i,j}\}$, where i,j range from 0 to 7. An example of such a matrix is a conventional MPEG-coding-scheme (i.e., Test Models 5 (TM5)) matrix for intra-pictures in which the coding mode for each macro-block is selected by comparing the energy of the predictive residuals (error signal). Namely, the intrade-mode decision is determined by comparison of the variance of the macro-block pixels against the variance of the predictive residuals for each coding mode.

The quantization matrix for partial encoding for the current intra-pictures is computed as:

$\overline{W}_{i,j} = W_{i,j}$ if $i <= i_{\alpha_I}$ and $j <= j_{\alpha_I}$, otherwise $\overline{W}_{i,j} = 255$.

Finally, in step 110, the modified quantization matrix is encoded, and the encoded signals are forwarded to the decoding side.

II. The Current Picture is Encoded as a Predictive (P) Picture.

If the P picture is detected in step 102, the P picture undergoes a full-pel (reduced resolution) motion prediction in step 120. The operation of steps 122 through step 128 is essentially the same as that described above with respect to step 104 through step 110. The only notable difference is that the setting of $\alpha_P$ depends on the location of this P picture in the current GOP. Hence, the discussion of similar components described in the preceding paragraphs is omitted to avoid redundancy. The setting of $\alpha_P$ depends on the location of this P picture in the current GOP. As the P pictures are in the GOP later, a lower prediction drift will result in subsequent frames before an I picture resets the prediction cycle. We denote the GOP size (the number of pictures in a Group of Pictures) as N, and the relative position of the P picture in the GOP as n. $\alpha_P$ is computed as:

$\alpha_P = \alpha_I^{(1-n/N)}$, where n ranges from M−1 to N−1.

III. The Current Picture is Encoded as a Bi-Directional-Predicted Picture.

If the current picture is encoded as a bi-directional picture, perform-normal encoding as B pictures do not contribute to the prediction drift on the decoder side; therefore no encoding-time-complexity-reduction preparation is needed.

The foregoing has disclosed a method and system for reducing the processing requirements associated with decompression methodology by adaptively changing the encoding mode in a video encoder. It should be apparent to those skilled in the art that certain advantages of the method and system have been achieved by increasing the decompression efficiency while not overly degrading the ultimate video image. By designing an encoding process such that certain compression efficiency is maintained during encoding, a complexity reduction can be achieved with less quality degradation to reduce the prediction drift during decoding when compared to a normal encoding process optimized for fixed full quality decoding.

While the preferred embodiments of the present invention have been illustrated and described, it will be understood by those skilled in the art that various changes and modifications may be made and equivalents substituted for elements thereof without departing from the true scope of the present invention. Therefore, it is intended that the present invention not be limited to the particular embodiment disclosed as the best mode contemplated for carrying out the present invention, but that the present invention include all embodiments falling within the scope of the appended claims.

What is claimed is:

1. A method for encoding a stream of input-video image having at least one macro-block, the method comprising the steps of:
   generating a motion vector for each macro-block of said input-video image;
   generating a predictive-image signal of said input-video image based on said motion vector;
   transforming said predictive-image signal into a two-dimensional array of DCT coefficients;
   modifying the array of said DCT coefficients into a set of new DCT coefficients according to predetermined criteria, wherein said modifying step includes discarding the last-column DCT coefficients and the last-row DCT coefficients alternatively until the energy level of said DCT coefficients reaches a predetermined energy level and, assigning said discarded column or row with a predetermined value;
   quantizing said new DCT coefficients into a quantized DCT value;
   performing a zigzag scan to read each row of said new DCT coefficients into a serial chain; and,
   coding said serial chain from said zigzag scan and said motion vector to produce an encoded macro-block.

2. The method of claim 1, wherein the array of DCT coefficients is an 8×8 matrix.

3. The method of claim 1, wherein the step of transforming said predictive-image signal into the array of said DCT coefficients comprises the conversion of said DCT coefficients from a time domain into a frequency domain.

4. The method of claim 1, wherein the step of coding is performed according to a predetermined encoding-configuration table.

5. The method of claim 1, further comprising the steps of:
   dequantizing said quantized DCT value to generate dequantized, decoded data;
   transforming said dequantized, decoded data from a frequency domain to a spatial domain to produce reference data; and,
   performing a motion compensation on said reference data to produce motion-compensation pictures.

6. The method of claim 1, further comprising the steps of performing a full-pel motion compensation on a predictive (P) picture of said input-video image prior to the step of transforming said predictive-image signal into the array of said DCT coefficients.

7. The method of claim 1, further comprising the step of forwarding said encoded macro-block to a decoding process.

8. A method for encoding a stream of input-video image having at least one macro-block, the method comprising the steps of:
   generating a motion vector for each macro-block of said input-video image;
   generating a predictive-image signal of said input-video image based on said motion vector;
   transforming said predictive-image signal into a two-dimensional array of DCT coefficients;
   modifying the array of said DCT coefficients into a set of new DCT coefficients according to predetermined criteria, wherein
   calculating a total energy level of said DCT coefficients excluding the lowest 2×2 DCT coefficients,
   discarding the last column and the last row of said DCT coefficients alternatively until the total energy level of said DCT coefficients reaches a predetermined energy level,
   assigning said discarded column and row to a predetermined value;
   quantizing said new DCT coefficients into a quantized DCT value;
   performing a zigzag scan to read each row of said new DCT coefficients into a serial chain; and,
   coding said serial chain from said zigzag scan and said motion vector to produce an encoded macro-block.

9. A method for encoding input-video image having at least one macro-block, the method comprising the steps of:
   (a) generating at least one motion vector and at least one motion-compensation-prediction value for each macro-block of said input-video image;
   (b) transforming said prediction value into a set of DCT coefficients;
   (c) modifying the set of said DCT coefficients into a set of new DCT coefficients according to predetermined criteria, wherein said modifying step includes discarding the last-column DCT coefficients and the last-row DCT coefficients alternatively until the energy level of said DCT coefficients reaches a predetermined energy level and, assigning said discarded column or row with a predetermined value;

(d) quantizing the set of said DCT coefficients; and, (e) coding said quantized set of said coefficients and said motion vector to produce an encoded macro-block.

10. The method of claim 9, further comprising the step of forwarding said encoded macro-block to a decoding process.

11. The method of claim 9, further comprising the step of determining the type of picture from said input-video image.

12. The method of claim 11, wherein, if a predictive picture is detected from said input-video image, performing a full-pel motion compensation on said input-video image prior to performing said step (b) of transforming said prediction value into the set of said DCT coefficients.

13. The method of claim 11, further comprises converting said motion vector to a full-motion vector when a predictive picture is detected from said input-video image.

14. The method of claim 9, further comprising the steps of:
dequantizing said quantized DCT value to generate dequantized, decoded data;
transforming said dequantized, decoded data from a frequency domain to a spatial domain to produce reference data; and,
performing motion compensation on said reference data to produce motion-compensation pictures.

15. A method for encoding input-video image having at least one macro-block, the method comprising the steps of:
(a) generating at least one motion vector and at least one motion-compensation-prediction value for each macro-block of said input-video image;
(b) transforming said prediction value into a set of DCT coefficients;
(c) modifying the set of said DCT coefficients into a set of new DCT coefficients according to predetermined criteria; wherein the modifying step includes
calculating a total energy level of said DCT coefficients excluding the lowest 2×2 DCT coefficients,
discarding the last column and the last row of said DCT coefficients alternatively until the total energy level of said DCT coefficients reaches a predetermined energy level and,
assigning said discarded column and row with a predetermined value;
(d) quantizing the set of said DCT coefficients; and,
(e) coding said quantized set of said coefficients and said motion vector to produce an encoded macro-block.

16. An encoding system for encoding an input-video image, comprising:
a motion-estimation-prediction module configured to receive said input-video image and to generate at least one motion vector and at least one prediction-error signal;
a discrete-cosine-transformer (DCT) module coupled to the output of said motion-estimation-module for transforming said prediction-error signal into a two-dimensional array of DCT coefficients, said DCT coefficients being modified according to the classification of a picture type from said input-video image, wherein said modification includes discarding the last-column DCT coefficients and the last-row DCT coefficients alternatively until the energy level of said DCT coefficients reaches a predetermined energy level and, assigning said discarded column or row with a predetermined value;

a quantization module, coupled to said DCT module, for quantizing said modified DCT coefficients to produce quantized coefficients;
a zig-zag scanning module, coupled to said quantization module, configured to convert said quantized coefficients into a serial representation; and,
a coding module for coding said quantized set of said coefficients and said motion vector to produce an encoded macro-block.

17. The encoding system of claim 16, further comprising:
an inverse-quantization module coupled to receive and inverse the quantized coefficients received from said quantization module;
an inverse-discrete-cosine transformer (IDCT) coupled to the output of said inverse-quantization module for transforming the dequantized coefficients from a frequency domain to a spatial domain; and,
a reference-frame-buffer for receiving output signals from said IDCT to form motion-compensated pictures.

18. The encoder system of claim 16, wherein said motion-estimation-prediction module performs a full-pel motion compensation when a P frame is received therein.

19. The encoder system of claim 16, wherein transforming said predictive-error signal into the array of said DCT coefficients comprises converting said DCT coefficients from a time domain into a frequency domain.

20. An encoding system for encoding an input-video image, comprising:
a motion-estimation-prediction module configured to receive said input-video image and to generate at least one motion vector and at least one prediction-error signal;
a discrete-cosine-transformer (DCT) module coupled to the output of said motion-estimation-module for transforming said prediction-error signal into a two-dimensional array of DCT coefficients, said DCT coefficients being modified according to the classification of a picture type from said input-video image, wherein said modification includes,
calculating a total energy level of said DCT coefficients excluding the lowest 2×2 DCT coefficients,
discarding the last column and the last row of said DCT coefficients alternatively until the total energy level of said DCT coefficients reaches a predetermined energy level and,
assigning said discarded column and row to a predetermined value;
a quantization module, coupled to said DCT module, for quantizing said modified DCT coefficients to produce quantized coefficients;
a zig-zag scanning module, coupled to said quantization module, configured to convert said quantized coefficients into a serial representation; and,
a coding module for coding said quantized set of said coefficients and said motion vector to produce an encoded macro-block.

21. A machine-readable medium having stored thereon data representing sequences of instructions, and the sequences of instructions which, when executed by a processor, cause the processor to:
generate a motion vector for each macro-block of said input-video image;
generate a predictive-image signal of said input-video image based on said motion vector;
transform said predictive-image signal into a two-dimensional array of DCT coefficients;

modify the array of said DCT coefficients into a set of new DCT coefficients according to predetermined criteria, wherein said modification includes discarding the last-column DCT coefficients and the last-row DCT coefficients alternatively until the energy level of said DCT coefficients reaches a predetermined energy level and, assigning said discarded column or row with a predetermined value;

quantize said new DCT coefficients into a quantized DCT value;

perform a zigzag scan to read each row of said new DCT coefficients into a serial chain; and, code said serial chain from said zigzag scan and said motion vector to produce an encoded macro-block.

22. The machine-readable medium of claim 21, wherein said processor is further operative to:

dequantize said quantized DCT value to generate dequantized, decoded data;

transform said dequantized, decoded data from a frequency domain to a spatial domain to produce reference data; and, perform motion compensation on said reference data to produce motion-compensation pictures.

23. The machine-readable medium of claim 21, wherein said processor is further operative to convert said motion vector to a full motion vector when a predictive picture is detected from said input-video image.

24. A machine-readable medium having stored thereon data representing sequences of instructions, and the sequences of instructions which, when executed by a processor, cause the processor to:

generate a motion vector for each macro-block of said input-video image;

generate a predictive-image signal of said input-video image based on said motion vector;

transform said predictive-image signal into a two dimensional array of DCT coefficients;

modify the array of said DCT coefficients into a set of new DCT coefficients according to predetermined criteria;

quantize said new DCT coefficients into a quantized DCT value;

perform a zigzag scan to read each row of said new DCT coefficients into a serial chain; and, code said serial chain from said zigzag scan and said motion vector to produce an encoded macro-block, wherein the array of said DCT coefficients is modified by calculating a total energy level of said DCT coefficients excluding the lowest 2×2 DCT coefficients; discarding the last column DCT coefficients and the last row DCT coefficients alternatively until the energy level of said DCT coefficients reaches a predetermined energy level; and, assigning said discarded column or row to a predetermined value.

* * * * *